United States Patent
Bhure

(10) Patent No.: US 12,341,786 B1
(45) Date of Patent: Jun. 24, 2025

(54) DETECTING MALICIOUS DNS REQUESTS USING MACHINE LEARNING

(71) Applicant: F5, Inc., Seattle, WA (US)

(72) Inventor: Sagar Bhure, Champa (IN)

(73) Assignee: F5, Inc., Seattle, WA (US)

( * ) Notice: Subject to any disclaimer, the term of this patent is extended or adjusted under 35 U.S.C. 154(b) by 144 days.

(21) Appl. No.: 17/851,583

(22) Filed: Jun. 28, 2022

(51) Int. Cl.
*H04L 9/40* (2022.01)
*H04L 61/4511* (2022.01)

(52) U.S. Cl.
CPC ...... *H04L 63/1416* (2013.01); *H04L 61/4511* (2022.05); *H04L 63/1441* (2013.01)

(58) Field of Classification Search
CPC ............. H04L 63/1416; H04L 63/1441; H04L 61/4511
See application file for complete search history.

(56) References Cited

U.S. PATENT DOCUMENTS

| | | | |
|---|---|---|---|
| 7,343,397 B2 | 3/2008 | Kochanski | |
| 8,583,801 B2 | 11/2013 | Fleischman et al. | |
| 8,671,221 B2 | 3/2014 | Shribman et al. | |
| 8,676,989 B2 | 3/2014 | Truehaft et al. | |
| 8,972,580 B2 | 3/2015 | Fleischman et al. | |
| 10,033,692 B1 | 7/2018 | Vavrusa | |
| 2002/0010798 A1 | 1/2002 | Ben-Shaul | |
| 2003/0182423 A1 | 9/2003 | Shafir | |
| 2008/0276313 A1* | 11/2008 | Kummu | H04L 63/1441 717/174 |
| 2009/0070453 A1 | 3/2009 | Douglis | |
| 2009/0094382 A1 | 4/2009 | Tsimelzon | |
| 2009/0210526 A1 | 8/2009 | Howell | |
| 2010/0011420 A1 | 1/2010 | Drako | |
| 2012/0017090 A1 | 1/2012 | Gould | |

(Continued)

FOREIGN PATENT DOCUMENTS

| | | | | |
|---|---|---|---|---|
| CN | 108200054 B | * | 2/2021 | ......... H04L 61/1511 |
| CN | 108600200 B | * | 6/2021 | ......... H04L 61/1511 |

OTHER PUBLICATIONS

Kingma, D.P., et al.—Adam: A Method for Stochastic Optimization, submitted Dec. 22, 2014, last revised Jan. 30, 2017, Cornell University [doi.org/10.48550/arXiv.1412.6980].

(Continued)

*Primary Examiner* — Eric W Shepperd
(74) *Attorney, Agent, or Firm* — Troutman Pepper Locke LLP

(57) ABSTRACT

Technologies related to malicious DNS request detection are disclosed. A DNS server can use a machine learning model to analyze DNS requests and to detect requests that are potentially malicious. The machine learning model can comprise a neural network (such as a convolutional neural network) that is trained using a corpus of known malicious and non-malicious DNS requests. Data included in a DNS request can be provided as input to a machine learning algorithm (such as a neural network algorithm) that uses the input data and the machine learning model to generate a prediction of whether the DNS request is malicious. If the DNS request is determined to likely be malicious then the request can be blocked (for example by providing a fake address in response to the DNS request). If the DNS request is determined to likely be non-malicious, then the DNS request can be allowed.

12 Claims, 7 Drawing Sheets

(56) References Cited

U.S. PATENT DOCUMENTS

| | | |
|---|---|---|
| 2012/0203861 A1 | 8/2012 | Flack |
| 2012/0278626 A1 | 11/2012 | Smith |
| 2013/0318602 A1 | 11/2013 | Devarapalli |
| 2014/0244725 A1 | 8/2014 | Fleischman |
| 2014/0317177 A1 | 10/2014 | Day |
| 2015/0163245 A1 | 6/2015 | Kondamuru |
| 2015/0207812 A1* | 7/2015 | Back .................. H04L 63/1408 726/23 |
| 2016/0028847 A1 | 1/2016 | Bradshaw |
| 2016/0308821 A1 | 10/2016 | Siba |
| 2017/0019371 A1 | 1/2017 | Osterweil |
| 2017/0324724 A1 | 11/2017 | Smith |
| 2018/0288086 A1* | 10/2018 | Amiri ....................... G06N 3/08 |
| 2018/0351972 A1* | 12/2018 | Yu ....................... H04L 63/1416 |
| 2018/0351974 A1* | 12/2018 | Baughman .......... H04L 63/1416 |
| 2018/0375713 A1 | 12/2018 | Huque |
| 2019/0058775 A1 | 2/2019 | Flack |
| 2019/0109772 A1 | 4/2019 | Lipstone |
| 2019/0199678 A1 | 6/2019 | Townsend |
| 2019/0230194 A1 | 7/2019 | Stevens |
| 2019/0342260 A1 | 11/2019 | Treuhaft |
| 2019/0394227 A1* | 12/2019 | Reybok, Jr. ......... H04L 63/1433 |
| 2020/0127964 A1 | 4/2020 | Stahura |
| 2020/0162417 A1 | 5/2020 | Teodosiu |
| 2020/0252803 A1* | 8/2020 | Shah .................... H04W 12/121 |
| 2020/0314055 A1 | 10/2020 | Blinn |
| 2020/0366711 A1 | 11/2020 | Phillips |
| 2020/0412791 A1 | 12/2020 | Gero |
| 2021/0092595 A1 | 3/2021 | Ramachandran |
| 2021/0200830 A1 | 7/2021 | Shribman |
| 2021/0266185 A1 | 8/2021 | Konda |
| 2022/0078044 A1 | 3/2022 | Shribman |
| 2022/0103525 A1 | 3/2022 | Shribman |
| 2022/0124168 A1 | 4/2022 | Shribman |
| 2022/0174031 A1* | 6/2022 | Davis .................. H04L 61/4511 |
| 2022/0417261 A1* | 12/2022 | Rashidi ................. G06F 16/245 |
| 2023/0185915 A1* | 6/2023 | Rao ....................... G06F 21/554 726/22 |
| 2023/0388322 A1* | 11/2023 | Bhatnagar ........... H04L 63/1425 |

OTHER PUBLICATIONS

PCT/US2023/069054: International Search Report and Written Opinion dated Oct. 18, 2023.

* cited by examiner

DETECTING MALICIOUS DNS REQUESTS USING MACHINE LEARNING

FIELD

This technology generally relates to detecting and preventing malicious computer network traffic, and more specifically to detecting malicious domain name system requests.

BACKGROUND

In computer networking environments, such as internal computer networks (e.g., intranets) and external computer networks (e.g., the Internet), a domain name system (DNS) can be used to resolve user-friendly domain names to network addresses. A computing device connected to a computing network that uses a DNS can transmit DNS requests to a DNS server to resolve a given domain name into a network address of another computing device that is associated with the domain name. For example, the DNS request can comprise a request to translate an Internet domain name (e.g., www.example.com) into an Internet Protocol address (e.g., 93.184.216.34 (IPv4) or 2606:2800:220:1:248:1893:25c8:1946 (IPv6)). The DNS request can comprise a message that conforms to a specified protocol, such as the DNS protocol. However, in at least some scenarios, malicious users can attack a computer network by targeting its DNS with malicious requests. Thus, it can be advantageous to detect and block such malicious DNS requests.

BRIEF SUMMARY

In an example embodiment, a method is implemented by a network traffic management system comprising one or more network traffic management apparatuses, server devices, or client devices, the method comprising: receiving a domain name system (DNS) request; determining using a machine learning model that the DNS request is a malicious DNS request; and blocking the malicious DNS request.

In another example embodiment, a system comprises one or more network traffic management modules, networking modules, or server modules, memory comprising programmed instructions stored thereon, and one or more processors configured to be capable of executing the stored programmed instructions to: receive a domain name system (DNS) request; determine using a machine learning model that the DNS request is a malicious DNS request; and block the malicious DNS request.

Another example embodiment comprises a non-transitory computer readable medium having stored thereon instructions comprising executable code that, when executed by one or more processors, causes the processors to: receive a domain name system (DNS) request; determine using a machine learning model that the DNS request is a malicious DNS request; and block the malicious DNS request.

In another example embodiment, a network traffic management apparatus comprises memory comprising programmed instructions stored thereon and one or more processors configured to be capable of executing the stored programmed instructions to: receive a domain name system (DNS) request; determine using a machine learning model that the DNS request is a malicious DNS request; and block the malicious DNS request.

DETAILED DESCRIPTION

In some scenarios, it is possible for malicious users to attack a computer network by targeting its domain name service system (DNS) with malicious requests. For example, an attacker can attempt to overwhelm a DNS server by transmitting a large number of requests to the DNS server. Additionally or alternatively, an attacker can transmit DNS requests that contain fake domain names. In certain protocols, a DNS server will contact DNS servers (such as an authoritative DNS server) in an attempt to identify a network address for a domain name it does not recognize. By transmitting DNS requests containing fake domain names, an attacker can, in at least some scenarios, overwhelm the DNS since every request with a fake domain name may cause a DNS server to contact other DNS servers in an attempt to resolve the fake domain name.

At least some of the technologies disclosed herein can be used to address these problems. A DNS server (such as a network traffic management apparatus) can be configured to be capable of using a machine learning model to analyze DNS requests and to detect requests that are potentially malicious. The machine learning model can comprise a neural network (such as a convolutional neural network) that is trained using a corpus of known malicious and non-malicious DNS requests. Features can be extracted from data included in a received DNS request (such as a domain name, a source address, etc.). These features can then be provided as inputs to a machine learning algorithm (such as a neural network algorithm) that uses the input features and the machine learning model to generate a prediction of whether the received DNS request is malicious. If the DNS request is determined to likely be malicious, the DNS request can be blocked (for example by providing a fake address in response to the DNS request). If the DNS request is determined to likely be non-malicious, then the DNS request can be allowed (for example by providing a valid address associated with a domain name included in the request, by transmitting the DNS request on to another computing device, etc.). Thus, in at least some scenarios, malicious DNS requests can be detected and blocked before they negatively impact the computer network.

Figure 1:
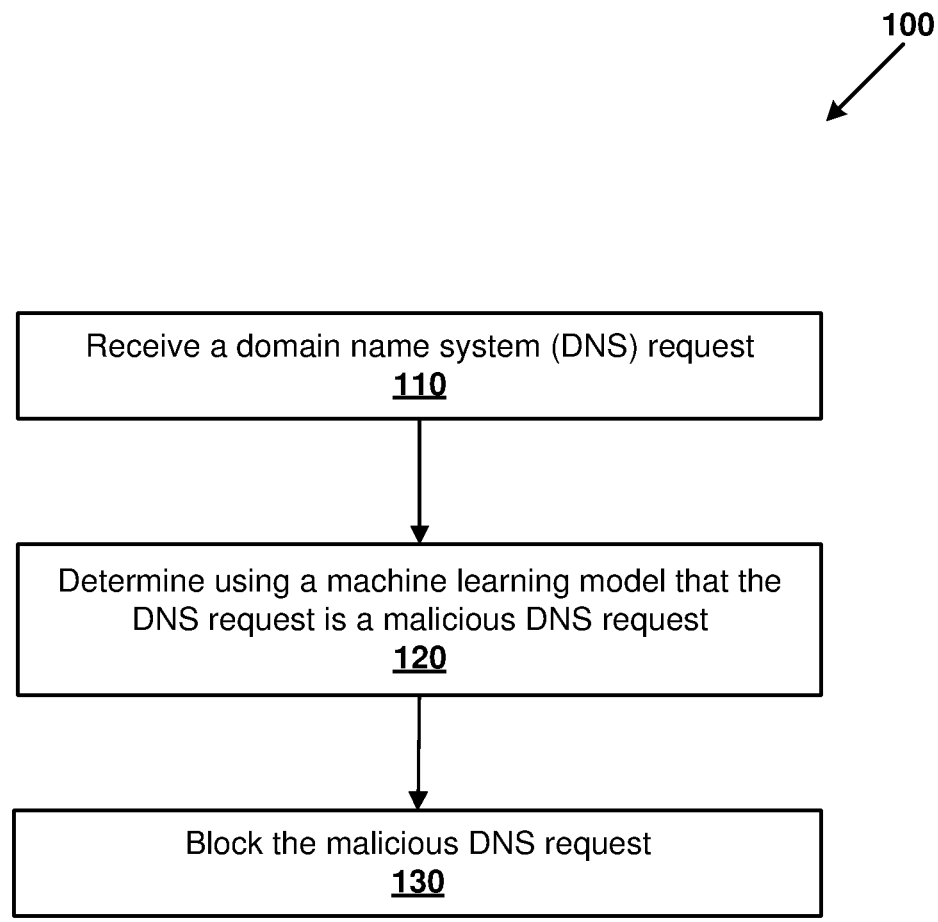
FIG. 1 is a flowchart of an example method for detecting a malicious domain name system (DNS) request using machine learning.

FIG. 1 is a flowchart of an example method 100 for detecting a malicious domain name system (DNS) request using machine learning. Any of the example systems and apparatuses described herein can be used to perform all or part of the example method 100. For example, the network traffic management apparatus 210, depicted in FIG. 2, can be used to perform all or part of the example method 100.

Figure 2:
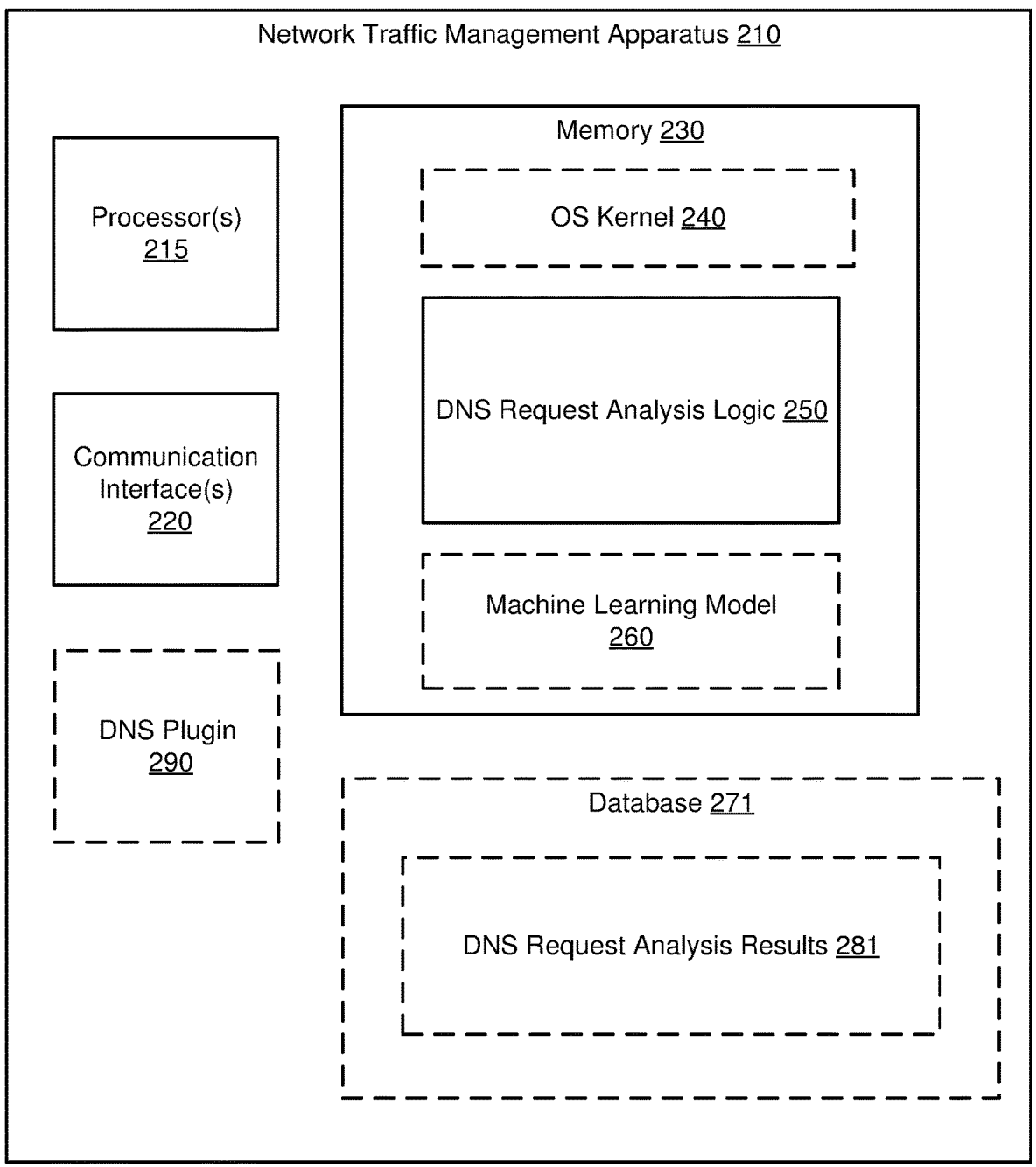
FIG. 2 is a block diagram of an example network traffic management apparatus for detecting malicious DNS requests using machine learning.

FIG. 2 is a block diagram of an example network traffic management apparatus 210 for detecting malicious DNS requests using machine learning. The network traffic management apparatus 210 comprises one or more processors 215, one or more communication interfaces 220, and a memory 230. The memory 230 comprises DNS request analysis logic 250 comprising instructions that, when executed by one or more of the processor(s) 215, cause the network traffic management apparatus 210 to perform operations for detecting malicious DNS requests as described herein. Optionally, the network traffic management apparatus 210 can comprise a database 271 comprising results 281 of DNS request analysis. Additionally or alternatively, the network traffic management apparatus 210 can be connected to a database that is external to the network traffic management apparatus 210. Optionally, the memory 230 can comprise a machine learning model 260. Additionally or alternatively, the network traffic management apparatus 210 can be connected to another computing device (not shown) that contains the machine learning model 260. Optionally, the memory 230 of the network traffic management apparatus 210 can comprise an operating system kernel 240 that can be used to manage execution of the DNS request analysis logic 250 and/or mediate access by the analysis logic 250 to the communication interface(s) 220 and/or the database 271. The network traffic management apparatus 210 can be implemented using a computing environment as described in more detail with reference to FIG. 7.

Referring to FIG. 1, at 110, a DNS request is received. For example, the DNS request can be received by the network traffic management apparatus 210. The DNS request can be received via one or more communication channels, such as one or more wired and/or wireless networks. For example, the network traffic management apparatus 210 can receive the DNS request via one or more of the communication interfaces 220. The DNS request comprises a request to translate a human-friendly domain name (such as a computer hostname) into an address that conforms to a protocol address format (such as an Internet Protocol address). The DNS request can comprise a message that conforms to a specified protocol, such as the DNS protocol.

Optionally, the network traffic management apparatus 210 can comprise a DNS server plugin 290. For example, the network traffic management apparatus 210 can be configured to support plug-in modules that can be used to implement additional functionality for the network traffic management apparatus 210. The DNS server plugin 290 can be used to provide all or part of the DNS request analysis logic 250. For example, when a request is received by one of the communication interfaces 220, the network traffic management apparatus 210 can determine that the request is a DNS request and can use the DNS plugin 290 to analyze the DNS request.

At 120, it is determined using a machine learning model that the DNS request is a malicious DNS request. For example, the network traffic management apparatus 210 can use the DNS request analysis logic 250 and the machine learning model 260 to determine that the DNS request is malicious. Determining that the DNS request is malicious can comprise analyzing one or more properties of the DNS request (e.g., a requestor address, one or more fields of a DNS query message, etc.) using the machine learning model. For example, one or more features can be extracted from fields of the DNS request and these features can be provided as inputs to a machine learning algorithm that accesses the machine learning model. The machine learning algorithm can use the provided input features and the machine learning model to generate an output that comprises a prediction value that indicates a probability that the DNS request is malicious. If the prediction value exceeds a specified threshold, it can be determined that the request is a malicious DNS request.

In at least some embodiments, a database can be used to determine whether the DNS request is a malicious DNS request. For example, the network traffic management apparatus 210 can comprise the database 271 that comprises the plurality of DNS request analysis results 281. In scenarios where a result of the analysis using the machine learning model 260 is unclear (such as where a resultant prediction is below a specified confidence level), the network traffic management apparatus 210 can use the database 271 to attempt to increase the confidence level of the prediction. The DNS request analysis results 281 can comprise records that comprise inputs associated with previously received DNS requests and associated maliciousness predictions. In at least some embodiments, the records can comprise feedback values that indicate whether the predictions were accurate. The records in the database 271 can be searched to identify records with inputs that are similar to the inputs generated based on the current DNS request. If some or all of the identified records agree with the prediction generated for the current DNS request, then, in at least some scenarios, the confidence value of the current prediction can be increased.

At 130, the malicious DNS request is blocked. For example, the network traffic management apparatus 210 can block the DNS request based on the determination made using the DNS request analysis logic 240. Blocking the DNS request can comprise transmitting a response indicating that no address could be found that is associated with a domain name included in the request. Alternatively, blocking the DNS request can comprise declining to respond to the malicious DNS request and/or taking some other action that indicates that the DNS server is not available. Alternatively, blocking the DNS request can comprise transmitting an alternative address in a response to the malicious DNS request. For example, an alternative address can be transmitted by the network traffic management apparatus 210 via one or more of the communication interfaces 220. In at least some such embodiments, a blackhole address (such as a blackhole Internet Protocol address) can be transmitted in response to the DNS request. A blackhole address is an address associated with one or more computing devices that is/are configured to decline to respond to any received requests. For example, a blackhole Internet Protocol address can be associated with one or more computing devices configured to decline to respond to any received Internet Protocol transmissions (or configured to decline to respond to any received Internet Protocol transmissions that contain the blackhole Internet Protocol address as a source Internet Protocol address). In such a configuration, a client that transmitted the malicious DNS request can be directed to a network address that appears to be legitimate but is, in fact, a blackhole. Additionally or alternatively, blocking the malicious DNS request can comprise responding to the malicious DNS request with a honeypot address (such as a honeypot Internet Protocol address). A honeypot address is an address associated with one or more computing devices that is/are configured to monitor the actions of potentially malicious users. For example, a honeypot Internet Protocol address can be associated with one or more computing devices configured to monitor the activities of any clients (or configured to monitor the activities of any clients that include the honeypot Internet Protocol address as a destination Internet Protocol address in their requests). In such a configuration, a client that transmitted the malicious DNS request can be directed to a network address that appears to be legitimate but is, in fact, configured to closely monitor the client and/or add the client's source address to a list of know attackers.

Figure 3:
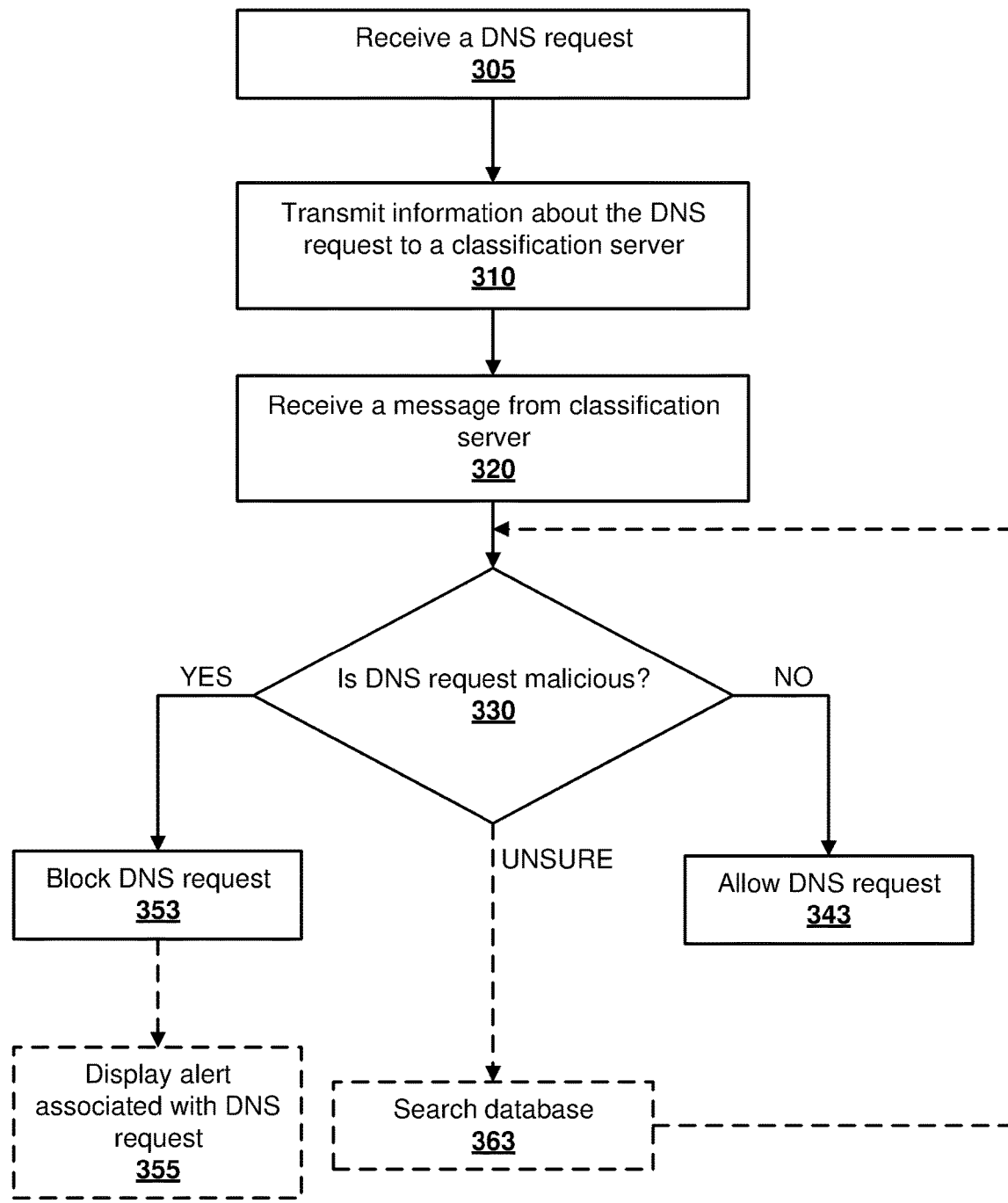
FIG. 3 is a flowchart of an example method for determining whether a DNS request is malicious.

FIG. 3 is a flowchart of an example method 300 for determining whether a DNS request is malicious. Any of the example systems and apparatuses described herein can be used to perform all or part of the example method 300. For example, the network traffic management apparatus 210, depicted in FIG. 2, can be used to perform all or part of the example method 300. For example, the example system 400, depicted in FIG. 4, can be used to perform all or part of the method 300.

Figure 4:
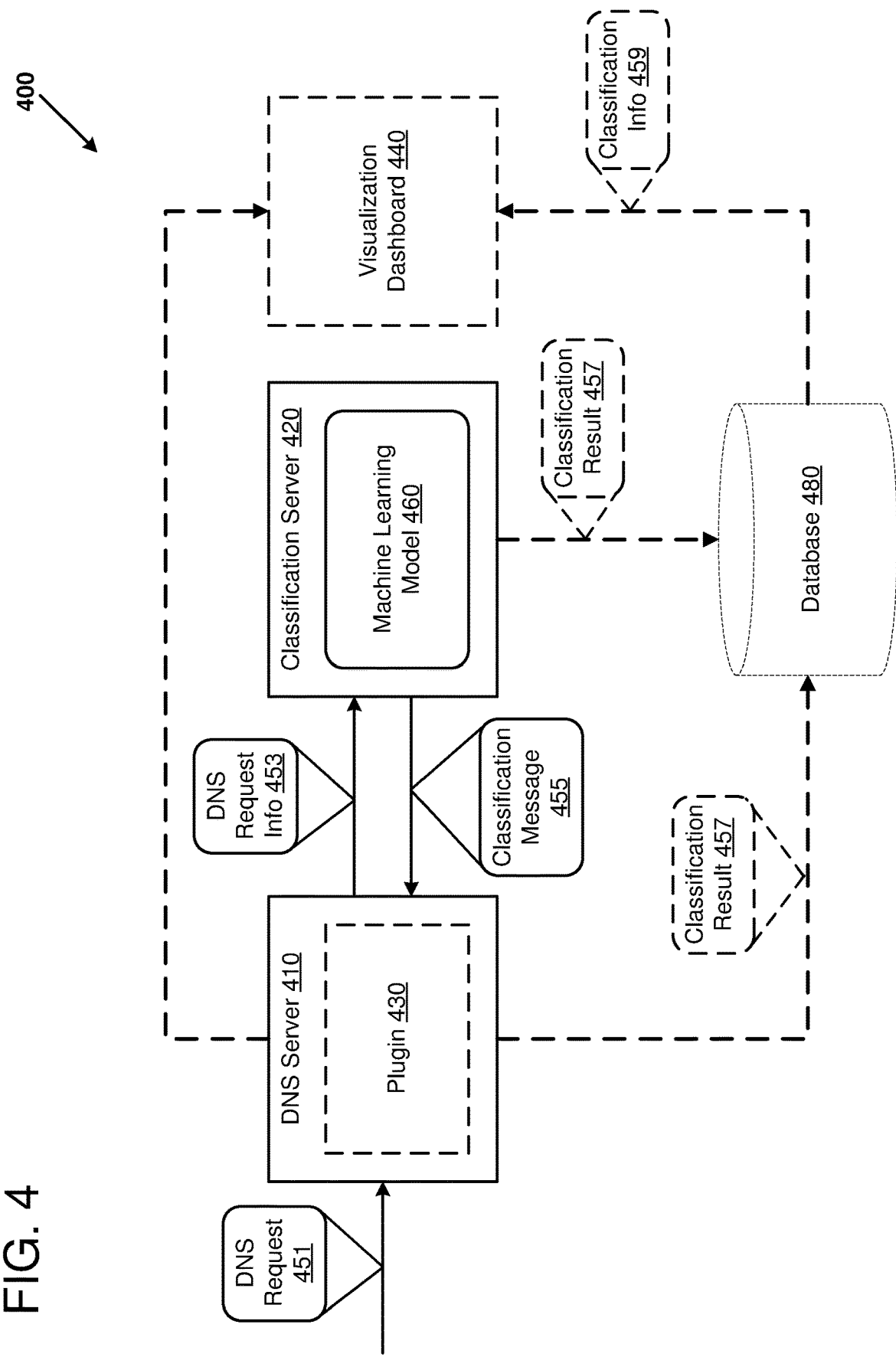
FIG. 4 is a system diagram of an example system for determining whether a DNS request is malicious.

FIG. 4 is a system diagram of an example system 400 for determining whether a DNS request 451 is malicious. The system 400 comprises a DNS server 410 and a classification server 420. The DNS server is configured to receive the DNS request 451, to transmit DNS request information 453 to the classification server 420, and to receive a classification message from the classification server 420. The classification server 420 comprises a machine learning model 460 and is configured to generate the classification message 455 based on an analysis of the DNS request information 453 using the machine learning model 460. The DNS server 410 and the classification server 420 can be implemented using separate computing devices. Alternatively, the DNS server 410 and the classification server 420 can be implemented using computer processes executing in a single computing environment. In at least some embodiments, the DNS server 410 and the classification server 420 can comprise microservices executing in virtualized computing environments (such as virtual machines and/or virtualization containers).

Referring to FIG. 3, at 305, a DNS request is received. For example, the DNS request 451 can be received by the DNS server 410. The DNS request 451 can be received via one or more communication channels, such as one or more wired and/or wireless networks, to which the DNS server 410 is connected. The DNS request 451 can comprise a request to translate a domain name (such as a human-readable computer hostname) into a network address that conforms to a network protocol address format. For example, the DNS request 451 can comprise a request to translate an Internet domain name into an Internet Protocol address. The DNS request can comprise a message that conforms to a specified protocol, such as the DNS protocol.

At 310, information about the DNS request is transmitted to a classification server. For example, the DNS server 410 can transmit information 453 about the DNS request 451 to the classification server 420. The DNS request information 453 can comprise data extracted from one or more fields of the DNS request 451 (such as a domain name, a source Internet Protocol address, etc.) In at least some embodiments, the information about the DNS request can comprise one or more feature values that can be provided as inputs to the machine learning model 460.

At 320, a message is received from the classification server. For example, the DNS server 410 can receive the classification message 455 from the classification server 420. The classification message 455 can comprise a maliciousness prediction generated by the classification server 420 using the DNS request information 453 and the machine learning model 460. For example, the classification message 455 can comprise a classification of the DNS request 451 as malicious or non-malicious that was generated using the machine learning model 460. In at least some embodiments, the classification message 455 can further comprise a confidence value associated with the classification. Such a confidence value can indicate a level of confidence in the accuracy of the classification.

At 330, it is determined using the message from the classification server whether the DNS request is malicious. For example, the DNS server 410 can use the classification message 455 to determine whether the DNS request is malicious. The determining can comprise evaluating a classification indicator included in the classification message 455. For example, the classification indicator may comprise one of two possible values, wherein a first possible value indicates that the DNS request information 453 has been classified as malicious and a second possible value indicates that the DNS request information 453 has been classified as non-malicious. In at least some embodiments, a confidence value associated with the classification indicator can be evaluated as well. For example, the confidence value can indicate a level of confidence in the accuracy of the classification prediction. In at least some such embodiments, the DNS server 410 can be configured to determine that the DNS request 451 is malicious if the classification value indicates that the DNS request information 453 has been classified as malicious and the associated confidence value is above a specified threshold.

If the DNS request is determined at 330 to be malicious, then at 353 the DNS request is blocked. For example, the DNS server 410 can block the DNS request 451 based on the determination. Blocking the DNS request can comprise transmitting a response that indicates that no address could be found that is associated with a domain name included in the DNS request 451. For example, in a scenario where the DNS request is received using a DNS protocol, a DNS protocol NXDOMAIN response can be transmitted to indicate that no address could be found. Alternatively, blocking the DNS request can comprise declining to respond to the malicious DNS request and/or taking some other action that indicates that the DNS server is not available. For example, the DNS server 410 can be configured to ignore the DNS request 451. In at least some such embodiments, the DNS server 410 can be configured to also ignore subsequent DNS requests from the client that transmitted the DNS request 451.

Alternatively, blocking the DNS request can comprise transmitting an alternative address in a response to the malicious DNS request. For example, the DNS server 410 can transmit an alternative address in response to the DNS request 451. In at least some embodiments, the DNS server 410 can transmit a blackhole address (such as a blackhole Internet Protocol address) in response to the DNS request 451. For example, a blackhole Internet Protocol address can be associated with one or more computing devices configured to decline to respond to any received Internet Protocol transmissions (or configured to decline to respond to any received Internet Protocol transmissions that contain the blackhole Internet Protocol address as a source Internet Protocol address). For example, such a computing device can be configured to drop packets that contain the blackhole Internet Protocol address as a source Internet Protocol address. In such a configuration, a client that transmitted the DNS request 451 can be directed to a network address that appears to be legitimate but is, in fact, a blackhole. Additionally or alternatively, blocking the malicious DNS request can comprise responding to the malicious DNS request with a honeypot address (such as a honeypot Internet Protocol address). For example, a honeypot Internet Protocol address can be associated with one or more computing devices configured to monitor the activities of any clients (or configured to monitor the activities of any clients that include the honeypot Internet Protocol address as a source Internet Protocol address in their requests). In such a configuration, a client that transmitted the DNS request 451 can be directed to a network address that appears to be legitimate but is, in fact, configured to closely monitor the client.

Optionally, at 355, an alert associated with the DNS request is displayed. For example, an alert can be displayed via a visual dashboard 440. The visual dashboard 440 can be displayed via a display device (such as a monitor) connected to a computing device. The alert can comprise a message that indicates that a malicious DNS request was detected. Visual styling (such as color, font, screen position, etc.) can be used to call a user's attention to the alert. In some embodiments, the DNS server 410 can be configured to update the visual dashboard 440 to display the alert. Additionally or alternatively, the visualization dashboard 440 can be configured to search a database 480 for information related to DNS request classifications. For example, the DNS server 410 and/or the classification server 420 can write a classification result record 457 associated with the classification of the DNS request 451 to the database 480. The visualization dashboard 440 can retrieve information 459 from classification result records (including the classification result record 457) from the database 480 and can generate an alert based on information retrieved from the classification result record 457.

If the DNS request is determined at 330 not to be malicious, then at 343 the DNS request is allowed. For example, the DNS server 410 can allow the DNS request 451, Allowing the DNS request can comprise transmitting a response to a client that transmitted the DNS request 451 which comprises an address (such as an Internet Protocol address) that is associated with a domain name included in the DNS request. The client can then use the address to access one or more networked computer devices associated with the address.

Optionally, the message from the classification server can comprise a classification of the DNS request as malicious or non-malicious, and a confidence level associated with the classification. For example, the classification message 455 from the classification server 460 can comprise a classification of the DNS request 451 and a confidence value of the classification. If the confidence value does not exceed a specified threshold then, at 363, a database can be searched. For example, the DNS server 410 can search the database 480 if a confidence value in the message 455 does not exceed a specified threshold. Alternatively, the classification server 420 can determine that the confidence value of the classification does not exceed the specified threshold and can search the database 480. Searching the database can comprise searching a database of verified domain names for a domain name of the DNS request. For example, if the confidence value of a classification made by the classification server 420 using the machine learning model 460 is below a specified threshold, the database 480 can be searched to determine whether a previously verified domain name matches a domain name included in the DNS request 451. If a matching domain name is found in the database 480, and the classification server 420 classified the DNS request 451 as non-malicious, then the confidence value of the classification can be increased to a value that meets or exceeds the specified threshold. If a matching domain name is found in the database 480, and the classification server 420 classified the DNS request 451 as malicious, then the classification can be changed from malicious to non-malicious and the confidence value of the classification can be increased. If a matching domain name is not found in the database 480, and the classification server 420 classified the DNS request 451 as malicious, then the confidence value of the classification can be increased to a value that meets or exceeds the specified threshold. If a matching domain name is not found in the database 480, and the classification server 420 classified the DNS request 451 as non-malicious, then, in at least some embodiments, the confidence value of the classification can be increased to a value that meets or exceeds the specified threshold. Alternatively, if a matching domain name is not found in the database 480, and the classification server 420 classified the DNS request 451 as non-malicious, then the classification and the classification value can be left unchanged, indicating that confidence in the classification of the DNS request 451 is low.

Optionally, the DNS server 410 can comprise a DNS server plugin 430. The DNS server 430 can be configured to support plug-in modules that can be used to implement additional functionality. The DNS server plugin 430 can be used by the DNS server 410 to perform some or all of the DNS request analysis operations described herein. For example, when the request 451 is received by the DNS server 410, the DNS server 410 can use the plugin 430 to extract the DNS request information 453 from the DNS request 451, transmit the DNS request information 453 to the classification server 420, receive the classification message 455 from the classification server 420, analyze the classification message 455, block or allow the DNS request 451, transmit an alert to the visualization dashboard 440, write the classification result 457 to the database 480, and/or search records in the database 480.

In any of the examples described herein, a machine learning model comprises one or more data structures generated using one or more machine learning algorithms. Example machine learning models include neural networks, support vector machines, k-means clusters, etc. The machine learning model can be generated using supervised machine learning techniques, unsupervised machine learning techniques, or some combination thereof. In at least some embodiments, the machine learning model can be generated using a training dataset. Such a training dataset can comprise a plurality of training records, wherein the training records comprise data fields generated based on received DNS requests (such as fields contained within the requests) and category assignments that indicate whether the associated requests were malicious. In such embodiments, the data fields generated based on the received requests can be referred to as independent variables and the category assignments can be referred to as dependent variables. One or more machine learning algorithms (such as one or more neural networking algorithms) can be used to analyze the training dataset and to generate a machine learning model (such as a neural network) that models relationships identified between the independent variables and the associated dependent variables.

The machine learning model can then be used to process a set of input values (which correlate to the independent variables in the training dataset) based on a subsequently received DNS request to generate a prediction (which correlates to the dependent variable of the training dataset) of whether the DNS request is malicious. Example input values include values generated based on contents of received DNS requests. Example request contents that can be used to train the machine learning model and that can be provided as inputs to the machine learning model include source addresses (such as source Internet Protocol addresses), domain names, etc. Other values can be provided which indicate whether the received requests were determined to be malicious. For example, the training records can comprise a corpus of data extracted from known malicious and non-malicious DNS requests. For example, the corpus can comprise domain names and/or sender addresses, and associated values that indicate whether domain names and/or sender addresses are malicious or non-malicious.

In at least some embodiments, feedback regarding the accuracy of the prediction can be used to update the machine learning model. For example, a difference between a predicted classification and an actual classification can be used to generate an error value which can be used to modify the machine learning model.

Figure 5:
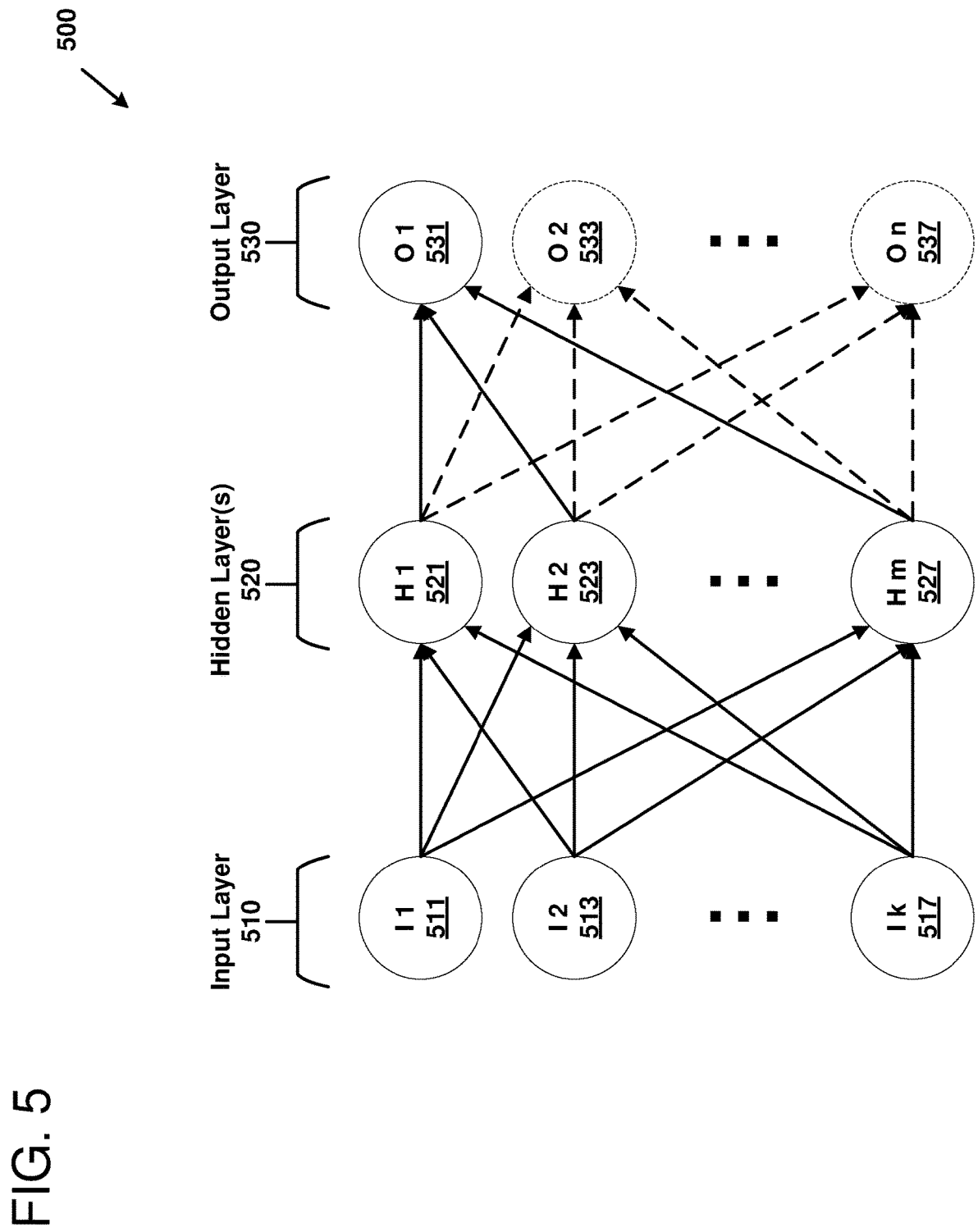
FIG. 5 is a block diagram of an example neural network.

FIG. 5 is a diagram of an example neural network 500. The example neural network 500 can be used as a machine learning model in any of the examples described herein. The neural network 510 comprises an input layer 510 that comprises a plurality of input nodes 511-517, and an output layer 530 that comprises one or more output nodes 531-537. The neural network 500 further comprises a hidden layer 520 that comprises a plurality of hidden nodes 521-527. Although a single hidden layer 520 is depicted in FIG. 5, in at least some embodiments the neural network 500 can comprise multiple hidden layers. Each of the input nodes 511-517 can be connected to one or more of the hidden nodes 521-527, and each of the hidden nodes 521-527 can be connected to one or more of the output nodes 531-537. In an embodiment comprising a plurality of hidden layers, nodes in the plurality of hidden layers can be connected to one another, such that nodes in a given hidden layer are connected to nodes in a subsequent hidden layer and nodes in a last hidden layer are connected to one or more of the output nodes 531-537.

The input nodes 511-517 represent potential inputs to the neural network 500 and the output nodes 531-537 represent potential outputs of the neural network 500, such as a prediction of whether a given DNS request is malicious, as described herein. Each node in the neural network 500 can be associated with a weight that is generated during a training of the neural network 500. The node weights can be used to modify output values that are transmitted by nodes in the neural network 500 to other nodes to which they are connected. For example, hidden layer node 521 can generate a value based on the input values it receives from input nodes 511-517 and can modify the generated value using a weight associated with the hidden layer node 521. The hidden layer node 521 can then transmit the modified value to the one or more output layer nodes (e.g., 531) to which it is connected.

The weights can be set to initial values and can be updated based on feedback. For example, an error that represents a difference between a predicted value and an actual value can be backpropagated through the neural network and used to modify the weights of the nodes in one or more of the layers of the neural network 500. In at least some embodiments, training of the neural network 500 can be repeated until an error rate for the neural network 500 is below a specified threshold and/or a specified number of training iterations have been performed.

In at least some embodiments, the machine learning model comprises a convolutional neural network. A convolutional neural network is a neural network that comprises one or more convolutional layers. A convolutional layer can be used to provide spatial data as an input to a neural network. In a convolutional layer, an input tensor can be abstracted into a feature map which is provided as input to subsequent layers in the neural network. Many malicious DNS requests include fake domain names. Some malicious users use algorithms (such as domain generation algorithms) do create fake domain names. Often, these fake domain names include common patterns of data (such as strings of 0's). However, where these patterns occur in the fake domain names varies (as attackers attempt to send a "new" fake domain name in each request to increase the load they are putting on the DNS). By treating domain names as spatial data, it is possible, using one or more convolutional neural network layers, to identify these common features in fake domain names, even when the features occur in different parts of the fake domain names (e.g., "0000.fb.com" and "www.0000.fb.com"). For example, domain names can be organized into two-dimensional matrices that are provided as input to a two-dimensional convolutional layer of the neural network. For example, a two-dimensional matrix can be created from a domain name by populating a first row of the matrix with a first sequence of a specified number of characters from the domain name, populating a second row of the matrix with a second sequence of the specified number of characters from the domain name, etc. Using such a representation, character patterns in domain names can be represented spatially and matched even when they occur in different places in different domain names. Patterns common to domain names present in malicious DNS request can thus be identified using one or more convolutional neural network layers.

Figure 6:
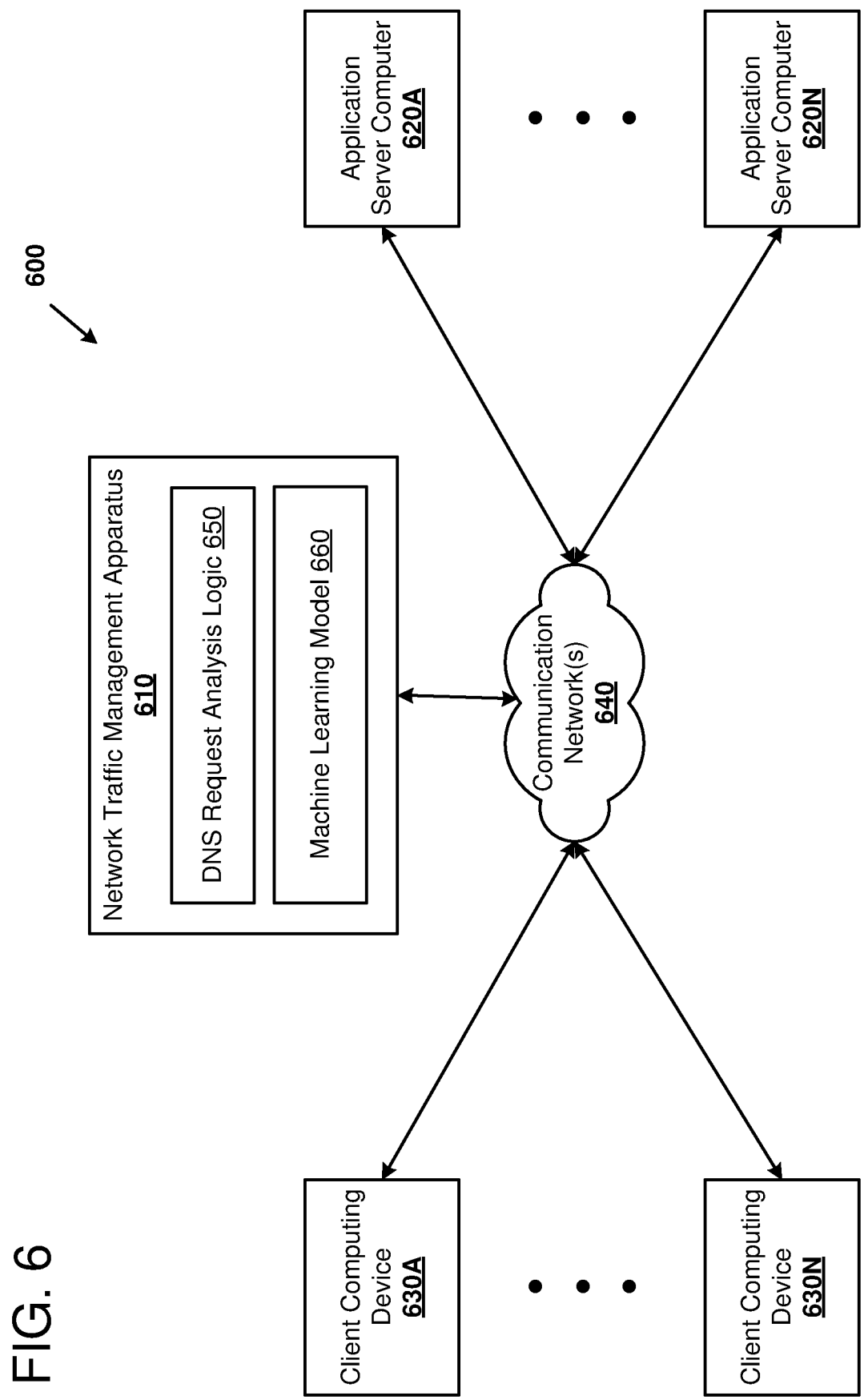
FIG. 6 is a block diagram of an example client-server architecture including a network traffic management apparatus for detecting malicious DNS requests using machine learning.

FIG. 6 illustrates an example client-server architecture 600 (also referred to as a network traffic management system) that incorporates a network traffic management apparatus 610 for detecting malicious DNS requests. The client-server architecture 600 includes a network traffic management apparatus 610 that can be accessed by one or more server computers (such as application server computers 620A-N) and one or more client devices (such as client computing devices 630A-N) via a communication network (such as the communication network 640). The server computers 620A-N can communicate with one or more additional server computer(s) that are accessible via the communication network 640 (or another network). As one example, the communication network 640 can include a public network (e.g., the Internet) and devices attached to the network 640 can be accessed using public network addresses. Additionally or alternatively, the communication network 640 can include a private network and devices attached to the network 640 can be accessed using private network addresses.

The communication network 640 can include various wired and/or wireless communication technologies, such as a local area network (LAN), a wide area network (WAN), an intranet, the Internet, a public switched telephone network (PSTN), and so forth. The devices connected to the communication network 640 can communicate with each other using various communications protocols, such as the domain name service (DNS) protocol, transmission control protocol with Internet protocol (TCP/IP) over Ethernet, and/or other customized or industry-standard protocols. The communication protocols can be used to transmit information over the network 640 using packet-based messages (e.g., Ethernet-based packet data networks) and/or other application programming interfaces (APIs). An API is a programmatic interface (e.g., a set of methods and/or protocols) for communicating among different modules. The communication network 640 can include various network devices, such as switches (multilayer or single-layer), routers, repeaters, gateways, network bridges, hubs, protocol converters, bridge routers, proxy servers, firewalls, network address translators, multiplexers, network interface controllers, wireless network interface controllers, modems, line drivers, and wireless access points, for example. As illustrated, the network traffic management apparatus 610 is positioned so that the network traffic management apparatus 610 can receive DNS protocol messages from the client computing devices 630A-N and/or the server computers 620A-N via the communication network 640. The network traffic management apparatus 610, the server computers 620A-N, and the client devices 630A-N can be coupled together via various topologies. It should be noted that the network topology illustrated in FIG. 6 has been simplified and that multiple networks and networking devices can be utilized to interconnect the various computing systems disclosed herein. Additionally, one or more of the devices of the client-server architecture 600 in these examples can be in a same or a different communication network including one or more public, private, or cloud networks, for example.

Figure 7:
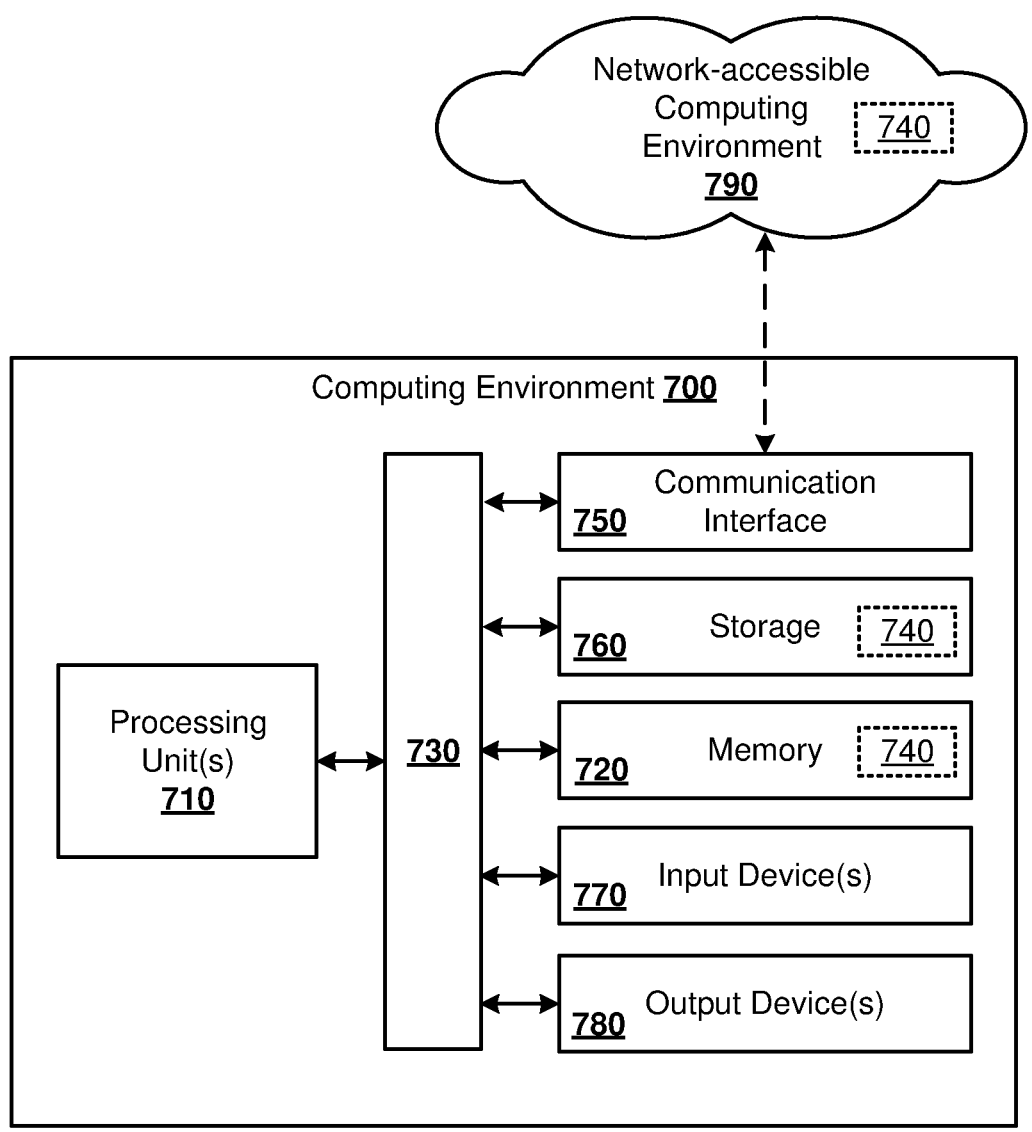
FIG. 7 is a block diagram of an example computing environment.

The server computers 620A-N, the client devices 630A-N, and the network traffic management system 600 can perform various computing tasks that are implemented using a computing environment, such as the computing environment described in more detail with respect to FIG. 7. The computing environment can include computer hardware, computer software, or a combination thereof. As a specific example, the computing environment can include general-purpose and/or special-purpose processor(s), configurable and/or hard-wired electronic circuitry, a communications interface, and computer-readable memory for storing computer-executable instructions to enable the processor(s) to perform a given computing task. The logic to perform a given task can be specified within a single module or interspersed among multiple modules. As used herein, the terms "module" and "component" can refer to an implementation within one or more dedicated hardware devices or apparatus (e.g., computer(s)), and/or an implementation within software hosted by one or more hardware devices or apparatus that may be hosting one or more other software applications or implementations.

The client devices 630A-N can include any type of computing device that can exchange network data, such as mobile communication devices, laptop computers, desktop computers, tablet computers, virtual machines executing within a cloud-computer-based environment, and so forth. The client devices 630A-N can run interface applications, such as web browsers or standalone client applications, which may provide an interface to communicate with (e.g., make requests for, and receive content stored on) one or more of the server computers 620A-N via the communication network 640. The client devices 630A-N can further include an output device (such as a display screen or touchscreen (not illustrated)) and/or an input device (such as a keyboard (not illustrated)). Additionally, one or more of the client devices 630A-N can be configured to execute software code (e.g., JavaScript code within a web browser) in order to log client-side data and provide the logged data to the network traffic management apparatus 610 or the server computers 620A-N.

The server computers 620A-N can include any type of computing device that can exchange network data. For example, the server computers 620A-N can exchange network data with the client devices 630A-N and with each other. As another example, the server computers 620A-N can exchange communications along communication paths specified by application logic in order to facilitate a client-server application interacting with the client devices 630A-N. Examples of the server computers 620A-N can include application servers, database servers, access control servers, web servers, and encryption servers. Accordingly, in some examples, one or more of the server computers 620A-N process login and other requests received from the client devices 630A-N via the communication network 640 according to the Hypertext Transfer Protocol (HTTP) or Hypertext Transfer Protocol Secure (HTTPS) application-layer protocol. A web application may be operating on one or more of the server computers 620A-N and transmitting data (e.g., files or web pages) to the client devices 630A-N (e.g., via the network traffic management apparatus 610) in response to requests from the client devices 630A-N. The server computers 620A-N can be hardware and/or software and may represent a system with multiple servers in a pool, which may include internal or external networks.

While the server computers 620A-N are illustrated as single devices, one or more actions of each of the server computers 620A-N may be distributed across one or more distinct network computing devices that together comprise one or more of the server computers 620A-N. Moreover, the server computers 620A-N are not limited to a particular configuration. Thus, the server computers 620A-N may contain network computing devices that operate using a coordinated approach, whereby one of the network computing devices of the server computers 620A-N operate to manage or otherwise coordinate operations of the other network computing devices. Each of the server computers 620A-N can operate as a networked computing device within a cluster architecture, a computing device within a peer-to peer architecture, a virtual machine, or a resource within a cloud-based computer architecture, for example. Thus, the technology disclosed herein is not to be construed as being limited to a single environment and other configurations and architectures are also envisaged. For example, one or more of the server computers 620A-N can operate within the network traffic management apparatus 610 itself rather than as a stand-alone server device communicating with the network traffic management apparatus 610 via communication network 640. In this example, the one or more of the server computers 620A-N operate within a memory of the network traffic management apparatus 610.

The network traffic management apparatus 610 can include any type of computing device that can be used for managing network traffic. The network traffic management apparatus 610 can perform a number of functions, including providing network security, access control, load balancing network traffic across the server computers 620A-N, and/or accelerating network traffic associated with an application hosted by one or more of the server computers 620A-N, for example. Such functions can be performed by one or more services. These services can be incorporated into workloads that are executed by the network traffic management apparatus 610. For example, the network traffic management apparatus 610 can include a workload that is used to perform proxy and other services on behalf of the server 620A-N and to manage traffic between the clients 630A-N and the servers 620A-N. Additionally, the network traffic management apparatus 610 can include other network devices such as one or more routers or switches, for example.

The network traffic management apparatus 610 can include DNS request analysis logic 650, and a machine learning model 660, that can be used to analyze DNS request as described above with reference to FIGS. 1-5. In some embodiments, the DNS request analysis logic 650 can be implemented using a plug-in architecture.

While the network traffic management apparatus 610 is illustrated in this example as including a single device, the network traffic management apparatus 610 can include a plurality of devices or blades each having one or more processors (each processor with one or more processing cores) that implement one or more components of this technology. In these examples, one or more of the devices can have a dedicated communication interface or memory. For example, the network traffic management apparatus 610 can comprise a first computing device configured to receive and respond to DNS requests (such as DNS server 410, depicted in FIG. 4) and another computing device configured to analyze DNS request information using the machine learning model 660 (such as the classification server 420, depicted in FIG. 4).

Additionally or alternatively, one or more of the devices can utilize the memory, communication interface, or other hardware or software components of one or more other devices included in the network traffic management apparatus 610. Additionally, the network traffic management apparatus 610 and/or application(s) executed by the network traffic management apparatus 610 can be operative in a cloud-based computing environment. The application(s) can be executed within or as virtual machine(s) or virtual server(s) that can be managed in a cloud-based computing environment. For example, the application(s), and even the network traffic management apparatus 610 itself, can be located in virtual server(s) running in a cloud-based computing environment rather than being tied to one or more specific physical network computing devices. Also, the application(s) can be running in one or more virtual machines (VMs) executing on the network traffic management apparatus 610. Additionally, in one or more examples of this technology, virtual machine(s) running on the network traffic management apparatus 610 can be managed or supervised by a hypervisor. Additionally, one or more of the components that together comprise the network traffic management apparatus 610 can be standalone devices or integrated with one or more other devices or apparatuses, such as with one or more of the server computers 620A-N, for example.

Additionally, one or more of the components depicted in the client-server architecture 600, such as the network traffic management apparatus 610, server computers 620A-N, or client computing devices 630A-N, for example, may be configured to operate as virtual instances on the same physical machine. In other words, one or more of the network traffic management apparatus 610, server computers 620A-N, or client computing devices 630A-N may operate on the same physical device rather than as separate devices communicating through communication network 640. Additionally, there may be more or fewer network traffic management apparatuses, client computing devices, or server computers than illustrated in FIG. 6.

In a particular example, the client computing device 630A transmits a DNS request to the network traffic management apparatus 610. The network traffic management apparatus 610 uses the DNS request analysis logic 650 and the machine learning model 660 to determine whether the DNS request is malicious. If the DNS request is malicious, the network traffic management apparatus 610 blocks the DNS request. If the DNS request is not malicious, the network traffic management apparatus 610 can transmit a valid response to the client computing device 630A.

Blocking the DNS request can comprise declining to transmit a response to the client computing device 630A. Alternatively, blocking the DNS request can comprise transmitting a response to the client computing device 630A that comprises a false address (such as a false Internet Protocol address). Such a false address can comprise a blackhole address or a honeypot address that is associated with one of the application server computers 620A-N. In such an embodiment, when the client computing device 630A transmits requests containing the false address, the requests will be routed to the one of the application server computers 620A-N associated with the false address.

For example, the application server computer 620A can be configured to treat the false address as a blackhole. When the client computing device 630A transmits requests containing the blackhole address as a destination address, the requests will be routed to the application server computer 620A. The application server computer 620A can decline to respond to any request containing the blackhole address as a destination address.

For example, the application server computer 620A can be configured to treat the false address as a honeypot. When the client computing device 630A transmits requests containing the honeypot address as a destination address, the requests will be routed to the application server computer 620A. The application server computer 620A can be configured to monitor client computing devices (e.g., client computing device 630A) that transmit requests that include the honeypot address as a destination address. For example, application server computer 620A can add the source address of the client computing device 630A to a watchlist. An entry for the client computing device 630A in the watchlist can be used to trigger elevated security measures for the client computing device 630A (such as bandwidth throttling, elevated logging levels, stricter firewall rules, restriction of access to sensitive data, etc.).

In any of the examples described herein, a computing device can include one or more processor(s), one or more communication interface(s), and one or more memories. A processor, communication interface, and memory can be coupled together with an interconnect so that components of a computer apparatus can communicate with each other using the interconnect. The communication interface can be used to send and receive communications (e.g., network packets) with other computing devices, such as a client and an application server. A processor can be used to execute computer-executable instructions that are stored in memories and/or storage resources. The computer-executable instructions can be organized into software routines (also referred to as modules or components) comprising executable code to perform various computing tasks. Various organizations of routines are possible. For example, routines can be sub-divided into smaller routines and/or combined into larger routines. A memory can also include structured and/or unstructured data that are used by the software routines to perform the computing tasks.

FIG. 7 illustrates a block diagram of a generalized example of a suitable computing environment 700 that can be used to implement the examples, techniques, and technologies described herein. For example, the computing environment 700 can be used to implement a computing device (such as a network traffic management apparatus, DNS server, classification server, etc.) that performs operations for detecting malicious DNS requests as described herein.

The computing environment 700 includes at least one processing unit 710 and computer-readable memory 720, which are coupled together by an interconnect 730. The processing unit 710 executes computer-executable instructions. The processing unit 710 can include a general-purpose processor, a special-purpose processor, and combinations thereof. For example, the processing unit 710 can include a general-purpose central processing unit (CPU), a graphics processor, a processor in an application-specific integrated circuit (ASIC), a processor configured to operate using programmable logic (such as in a field-programmable gate array (FPGA)), and/or any other type of processor. In a multi-processing system, multiple processing units can be used to execute computer-executable instructions to increase processing power.

The memory 720 stores software 740 implementing one or more innovations described herein, in the form of computer-executable instructions suitable for execution by the processing unit 710. Specifically, the memory 720 can be used to store computer-executable instructions, data structures, input data, output data, and other information. The memory 720 can include volatile memory (e.g., registers, cache, random-access memory (RAM)), non-volatile memory (e.g., read-only memory (ROM), electrically erasable programmable ROM (EEPROM), and flash memory), and/or combinations thereof. The memory 720 can include operating system software (not illustrated). Operating system software can provide an operating environment for other software executing in the computing environment 700 and can coordinate activities of the components of the computing environment 700.

The interconnect 730 is used to connect different components of the computing environment 700 together so that the processing unit 710 can communicate with the different components and/or so that the different components can communicate with each other. For example, the interconnect 730 can include a bus, controller, and/or a network. As one example, the interconnect 730 can include a host bridge (also referred to as a northbridge) for connecting the processing unit 710 to relatively high-speed components (such as the memory 720) and an input/output bridge (also referred to as a southbridge) for connecting to relatively lower-speed components (such as a communications interface 750) within the computing environment 700. In some examples, one or more components of the computing environment 700 can be integrated within or connected directly to the processing unit 710.

The computing environment 700 can include a communication interface 750 for communicating with another computing entity using a communication medium (e.g., a physical layer). The communication interface 750 can implement all or a portion of a network protocol stack. The network protocol stack defines communication formats and rules for communicating between different devices connected to a network. For example, the network protocol stack can define modular layers for communication using the Open Systems Interconnection (OSI) model or another model (such as the Internet Protocol Suite). The OSI model standardizes and partitions a communication system into seven layers including a physical layer (referred to as layer 1) and an application layer (referred to as layer 7). The application layer can be used to define how applications access the communications subsystem. The physical layer defines the electrical and physical specifications for communication over a communication medium (also referred to as a physical transmission medium). The communication medium can be used to convey information, such as computer-executable instructions or other data, in a modulated data signal. A modulated data signal is a signal that has one or more of its characteristics adjusted in such a manner as to encode information in the signal. The communication interface 750 can include electronic and/or optical circuitry to receive and transmit communications signals that are encoded (e.g., according to a physical layer specification of the network stack) using an electrical, optical, radio frequency (RF), or another carrier signal. Accordingly, the communication interface 750 can be used to communicate over wired connections (e.g., twisted-wire pair, coaxial cable, and fiber optic connections) and/or wireless technologies (e.g., Bluetooth, Wi-Fi (IEEE 802.11), and cellular).

As a specific example with reference to FIG. 6, a communication interface of the network traffic management apparatus 610 operatively couples to and communicates with the communication network 640 so that the network traffic management apparatus 610 is coupled to and can communicate with the server computers 620A-N and the client computing devices 630A-N.

The computing environment 700 can include storage 760 that is used to store instructions for the software 740, data structures, and data, which can be used to implement the technologies described herein. The storage 760 can include electronic circuitry for reading and/or writing to removable or non-removable storage media using magnetic, optical, or other reading and writing system that is coupled to the processor. The storage 760 can include read-only storage media and/or readable and writeable storage media, such as magnetic disks, solid state drives, magnetic tapes or cassettes, compact disc read-only memories (CD-ROMs), compact disc-rewritables (CD-RWs), digital video discs (DVDs), or any other medium which can be used to store information and that can be accessed within the computing environment 700.

The computing environment 700 can include input device(s) 770. For example, the input device(s) 770 can provide an input interface to a user of the computing environment 700 and/or to receive inputs from a physical environment. The input device(s) 770 can include a tactile input device (e.g., a keyboard, a mouse, or a touchscreen), a microphone, a camera, a sensor, or another device that provides input to the computing environment 700.

The computing environment 700 can include output device(s) 780. For example, the output device(s) 780 can provide an output interface to a user of the computing environment 700 and/or to generate an output observable in a physical environment. The output device(s) 780 can include a light-emitting diode, a display, a printer, a speaker, a CD-writer, or another device that provides output from the computing environment 700. In some examples, the input device(s) 770 and the output device(s) 780 can be used together to provide a user interface to a user of the computing environment 700.

The computing environment 700 is not intended to suggest limitations as to scope of use or functionality of the technology, as the technology can be implemented in diverse general-purpose and/or special-purpose computing environments. For example, the disclosed technology can be practiced in a local, distributed, and/or network-enabled computing environment. In distributed computing environments, tasks are performed by multiple processing devices. Accordingly, principles and advantages of distributed processing, such as redundancy, parallelization, and replication also can be implemented, as desired, to increase the robustness and performance of the devices and systems of the examples. The examples may also be implemented on computer system(s) that extend across any suitable network using any suitable interface mechanisms and traffic technologies, including by way of example only, wireless traffic networks, cellular traffic networks, Packet Data Networks (PDNs), the Internet, intranets, and combinations thereof. As a specific example, a distributed computing environment can include the processing unit 710 and the network-accessible computing environment 790 that is linked through a communications network. In a distributed computing environment, program modules 740 (including executable instructions for performing operations as described herein) can be located in both local and remote memory storage devices.

The term computer-readable media includes non-transient media for data storage, such as memory 720 and storage 760, and does not include transmission media such as modulated data signals and carrier waves. Any of the disclosed methods can be implemented as computer-executable instructions stored on one or more computer-readable media and executed on a computer (e.g., any commercially available computer). Any of the computer-executable instructions for implementing the disclosed techniques as well as any data structures and data created and used during implementation of the disclosed embodiments can be stored on one or more computer-readable storage media. For example, the computer-executable instructions can be part of a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network, or other such network) using one or more network-attached computers.

This disclosure is set forth in the context of representative examples that are not intended to be limiting. Accordingly, this disclosure is directed toward all novel and non-obvious features and aspects of the various disclosed examples, alone and in various combinations and sub-combinations with one another. Many variations of the specific hardware and software used to implement the examples are possible, as will be appreciated by those skilled in the relevant art with the benefit of this disclosure. The disclosed systems, methods, and apparatus are not limited to any specific aspect or feature or combinations thereof, nor does the disclosed technology require that any one or more specific advantages be present, or problems be solved. Theories of operation, scientific principles, or other theoretical descriptions presented herein in reference to the disclosed technology have been provided for the purposes of better understanding and are not intended to be limiting in scope. The apparatus and methods in the appended claims are not limited to those apparatus and methods that function in the manner described by such theories of operation.

As used in this application the singular forms "a," "an," and "the" include the plural forms unless the context clearly dictates otherwise. The term "coupled" encompasses mechanical, electrical, magnetic, optical, as well as other practical ways of coupling or linking items together and does not exclude the presence of intermediate elements between the coupled items. The term "and/or" means any one item or combination of items in the phrase.

The recited order of processing elements or sequences, or the use of numbers, letters, or other designations therefore is not intended to limit the claimed processes to any order. Although the operations of some of the disclosed methods are described in a particular, sequential order for convenient presentation, it should be understood that this manner of description encompasses rearrangement, unless a particular ordering is required by specific claim language set forth below. For example, operations described sequentially may in some cases be rearranged or performed concurrently. Moreover, for the sake of simplicity, the attached figures may not show all the various ways in which the disclosed methods can be used in conjunction with other methods.

It should also be well understood that any software functionality described herein can be performed, at least in part, by one or more hardware logic components, instead of software. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), and so forth.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C, C++, Java, assembly language, or any other suitable programming language. Likewise, the disclosed technology is not limited to any particular computer or type of hardware. Certain details of suitable computers and hardware are well-known and need not be set forth in detail in this disclosure.

Having thus described many possible embodiments to which the principles of the invention may be applied, it will be recognized by those skilled in the art that the foregoing detailed disclosure is intended to be presented by way of example only and is not limiting. Various alterations, improvements, and modifications will occur and are intended to those skilled in the art, though not expressly stated herein. These alterations, improvements, and modifications are intended to be suggested hereby, and are within the spirit and scope of the invention. Accordingly, the scope of the claimed subject matter is defined by the following claims. We therefore claim as our invention all that comes within the scope of these claims.

What is claimed is:

1. A method implemented by a network traffic management system comprising one or more network traffic management apparatuses, server devices, or client devices, the method comprising:
   receiving a domain name system (DNS) request at a DNS server;
   transmitting the DNS request using the DNS server to a classification server that comprises a machine learning model, wherein the machine learning model comprises a convolutional neural network that comprises a two-dimensional convolutional layer;
   determining, by the classification server using the machine learning model, that the DNS request is a malicious DNS request, wherein the determining comprises organizing a domain name of the DNS request as a two-dimensional matrix and providing the two-dimensional matrix as an input to the two-dimensional convolutional layer of the convolutional neural network;
   transmitting a message from the classification server to the DNS server that indicates that the DNS request is malicious; and
   blocking the malicious DNS request by the DNS server based on the message from the classification server.

2. The method of claim 1, wherein the determining using the machine learning model that the DNS request is a malicious DNS request comprises:

classifying the DNS request using the machine learning model;

determining that a confidence value of the classification is less than a specified threshold confidence; and searching a database of verified domain names for a domain name of the DNS request.

3. The method of claim 1, further comprising:

transmit a blackhole Internet Protocol address in response to the DNS request.

4. A system comprising one or more network traffic management modules, networking modules, or server modules, memory comprising programmed instructions stored thereon, and one or more processors configured to be capable of executing the stored programmed instructions to:

receive a domain name system (DNS) request at a DNS server;

transmit the DNS request using the DNS server to a classification server that comprises a machine learning model, wherein the machine learning model comprises a convolutional neural network that comprises a two-dimensional convolutional layer;

determine, by the classification server using the machine learning model, that the DNS request is a malicious DNS request, wherein the determining comprises organizing a domain name of the DNS request as a two-dimensional matrix and providing the two-dimensional matrix as an input to the two-dimensional convolutional layer of the convolutional neural network;

transmit a message from the classification server to the DNS server that indicates that the DNS request is malicious; and block the malicious DNS request by the DNS server based on the message from the classification server.

5. The system of claim 4, wherein the determining using the machine learning model that the DNS request is a malicious DNS request comprises:

classifying the DNS request using the machine learning model;

determining that a confidence value of the classification is less than a specified threshold confidence; and searching a database of verified domain names for a domain name of the DNS request.

6. The system of claim 4, wherein the one or more processors are further configured to be capable of executing the stored programmed instructions to:

transmit a blackhole Internet Protocol address in response to the DNS request.

7. A non-transitory computer readable medium having stored thereon instructions comprising executable code that, when executed by one or more processors, causes the one or more processors to:

receive a domain name system (DNS) request at a DNS server;

transmit the DNS request using the DNS server to a classification server that comprises a machine learning model, wherein the machine learning model comprises a convolutional neural network that comprises a two-dimensional convolutional layer;

determine, by the classification server using the machine learning model, that the DNS request is a malicious DNS request, wherein the determining comprises organizing a domain name of the DNS request as a two-dimensional matrix and providing the two-dimensional matrix as an input to the two-dimensional convolutional layer of the convolutional neural network;

transmit a message from the classification server to the DNS server that indicates that the DNS request is malicious; and block the malicious DNS request by the DNS server based on the message from the classification server.

8. The non-transitory computer readable medium of claim 7, wherein the instructions further comprise executable code that, when executed by the one or more processors, causes the one or more processors to:

display an alert associated with the malicious DNS request via a visualization dashboard.

9. The non-transitory computer readable medium of claim 7, wherein the instructions further comprise executable code that, when executed by the one or more processors, causes the one or more processors to:

use a DNS server plugin to determine that the DNS request is malicious.

10. A network traffic management apparatus, comprising memory comprising programmed instructions stored thereon and one or more processors configured to be capable of executing the stored programmed instructions to:

receive a domain name system (DNS) request;

transmit the DNS request to a classification server that comprises a machine learning model, wherein the machine learning model comprises a convolutional neural network that comprises a two-dimensional convolutional layer;

determine, by the classification server using the machine learning model, that the DNS request is a malicious DNS request, wherein the determining comprises organizing a domain name of the DNS request as a two-dimensional matrix and providing the two-dimensional matrix as an input to the two-dimensional convolutional layer of the convolutional neural network;

receive a message from the classification server that indicates that the DNS request is malicious; and block the malicious DNS request based on the message from the classification server.

11. The network traffic management apparatus of claim 10, wherein the one or more processors are further configured to be capable of executing the stored programmed instructions to:

display an alert associated with the malicious DNS request via a visualization dashboard.

12. The network traffic management apparatus of claim 10, wherein the one or more processors are further configured to be capable of executing the stored programmed instructions to:

use a DNS server plugin to determine that the DNS request is malicious.

\* \* \* \* \*